Figure 1:
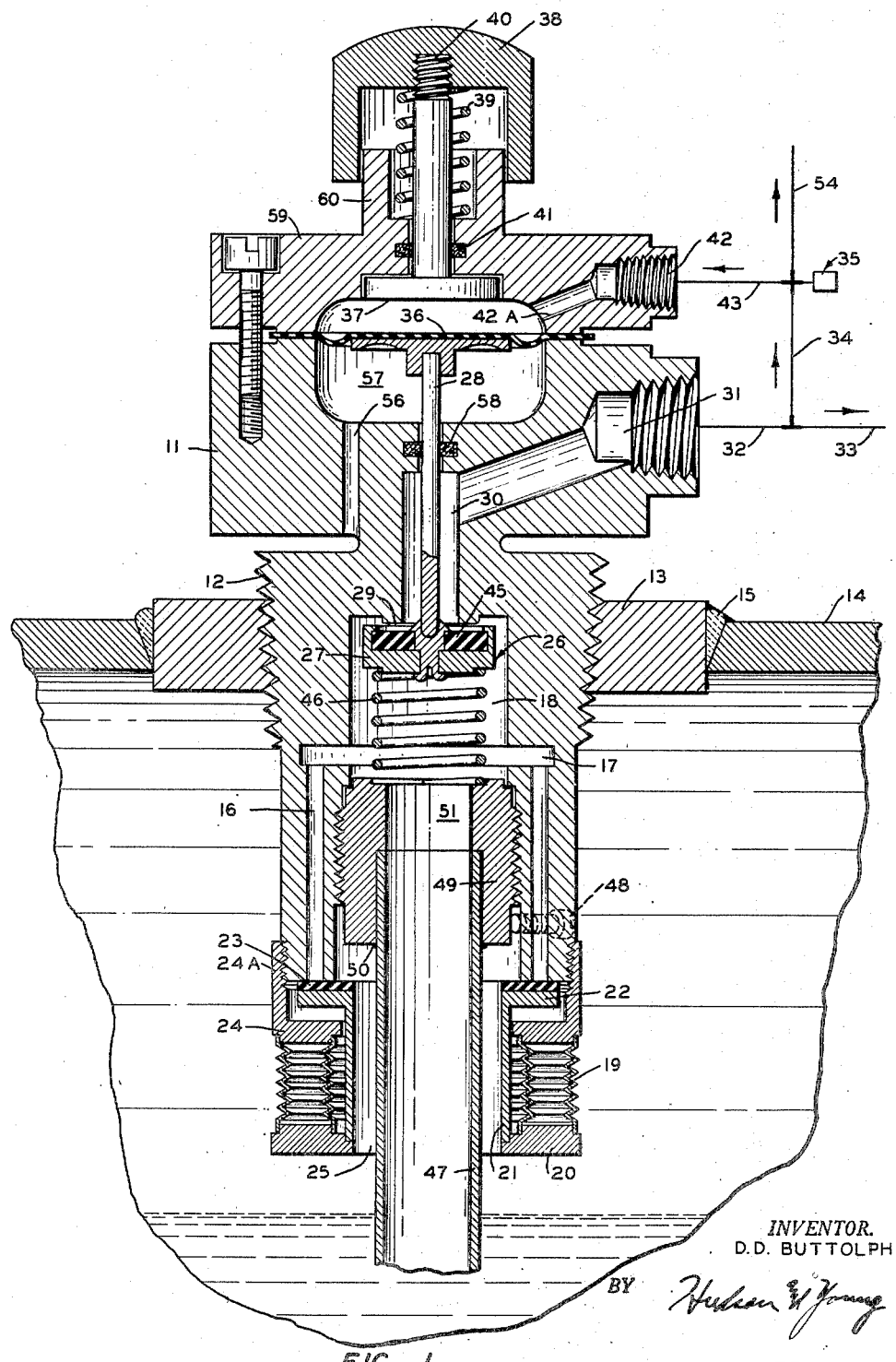

Aug. 7, 1956     D. D. BUTTOLPH     2,757,516

AUTOMATIC VAPOR-LIQUID SELECTOR VALVE

Filed Dec. 26, 1951     4 Sheets-Sheet 1

INVENTOR.
D. D. BUTTOLPH

BY

ATTORNEYS

Aug. 7, 1956 D. D. BUTTOLPH 2,757,516
AUTOMATIC VAPOR-LIQUID SELECTOR VALVE
Filed Dec. 26, 1951 4 Sheets-Sheet 2

INVENTOR.
D. D. BUTTOLPH

BY

ATTORNEYS

Aug. 7, 1956  D. D. BUTTOLPH  2,757,516
AUTOMATIC VAPOR-LIQUID SELECTOR VALVE
Filed Dec. 26, 1951  4 Sheets-Sheet 3

INVENTOR.
D. D. BUTTOLPH
BY *Hudson W. Young*
ATTORNEYS

2,757,516

AUTOMATIC VAPOR-LIQUID SELECTOR VALVE

Doyle D. Buttolph, Bartlesville, Okla., assignor to Phillips Petroleum Company, a corporation of Delaware Application December 26, 1951, Serial No. 263,256

8 Claims. (Cl. 62—1)

This invention relates to internal combustion engine operations. In one aspect it relates to an improved apparatus for use with liquefied petroleum gas as an internal combustion engine fuel. In another aspect it relates to a liquid-vapor selector valve for alternate delivery of liquefied gas, and vapor, in response to tank temperature for maintaining tank pressure at a minimum.

An object of this invention is to devise an apparatus for controlling the pressure of liquefied petroleum gas in internal combustion engine fuel tanks when the engine is powered with liquefied petroleum gas.

Another object of this invention is to devise an apparatus for use in maintaining relatively low pressures in liquefied petroleum gas automotive fuel tanks under atmospheric and road temperatures.

Still another object of my invention is to devise an apparatus for use in maintaining relatively low pressures in liquefied petroleum gas fuel tanks under high temperature operating conditions, which apparatus is relatively simple and positive in operation.

Still other objects and advantages of my invention will be realized upon reading the following disclosure.

The term "propane" as used hereinbelow refers to commercial propane, and specifically to liquefied petroleum gas. This latter term includes, in addition to propane, such other hydrocarbons as butane, isobutane, isopentane and the like. When one or more of these less volatile hydrocarbons is included with propane in liquefied petroleum gas, the latter has correspondingly lower vapor pressures than propane.

Since the vapor pressure of commercial propane is about 200 pounds per square inch at 100° F. the use of heavy pressure tanks as fuel tanks is necessary. At temperatures higher than 100° F., which temperatures are sometimes encountered during certain seasons of the year, propane has still higher vapor pressures than the above mentioned 200 pounds. Thus, the utilization of this liquefied fuel under such temperature and pressure conditions becomes a problem requiring careful solution.

In the prior art it is old to select liquid or gas withdrawal from a tank by pressure responsive means selecting the gas withdrawal above a predetermined pressure and the liquid withdrawal below said predetermined pressure. Pressure responsive means are particularly sensitive to maladjustment and failure to operate properly after a relatively short period of time. The pressure at which they open soon varies widely from the original predetermined pressure, which results in a dangerous condition and failure of their entire purpose. In contrast, thermal responsive means does not change in long periods of time, but always acts at the same predetermined temperature even after years have passed. I have now discovered that temperature responsive means can accomplish the better results as to pressure control in liquid or gas withdrawal selection and continue to accomplish accurate control over much longer periods of time, with less servicing and adjustment, than direct pressure control. In accordance with the objects of my invention I have devised an apparatus which controls the alternate delivery of liquefied fuel, or vapor, from a tank in response to tank temperature, delivering vapor when the tank is above a predetermined temperature and delivering liquid when the tank is below said temperature.

Figure 2:
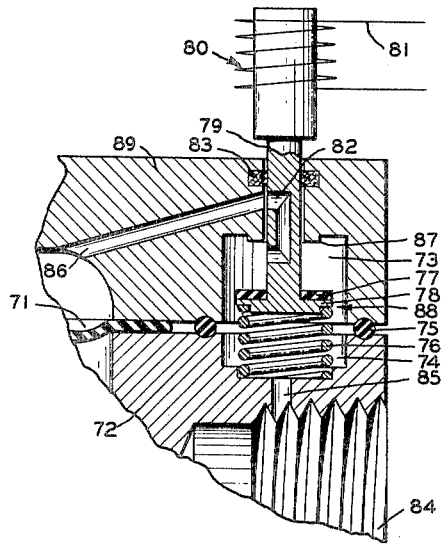
Figure 3:
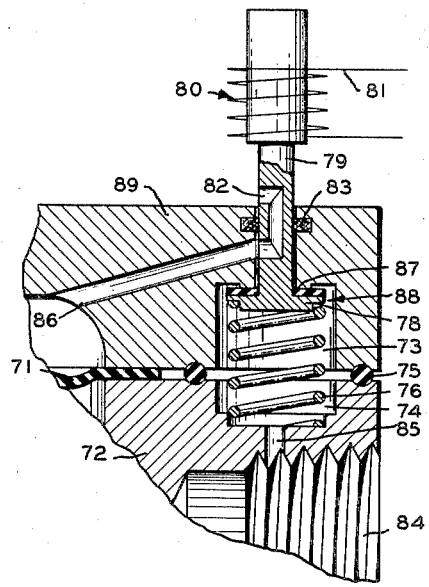
Figure 4:
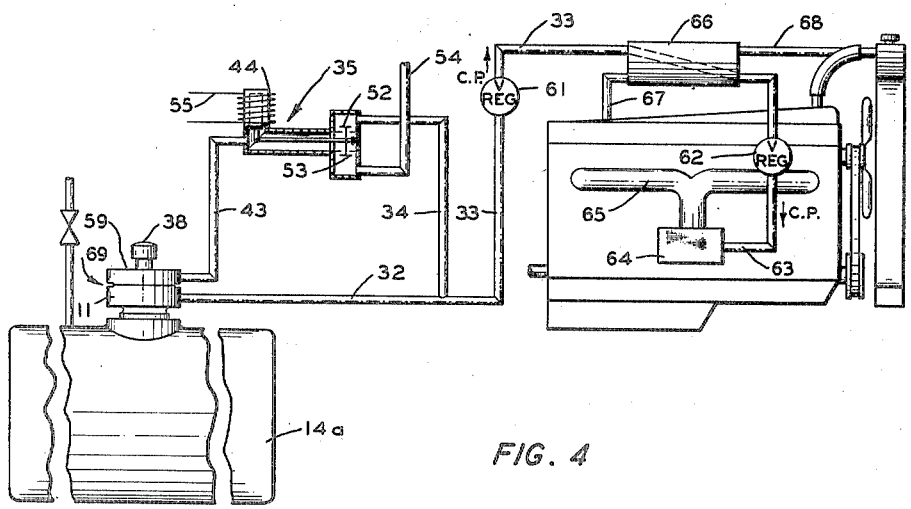
Figure 5:
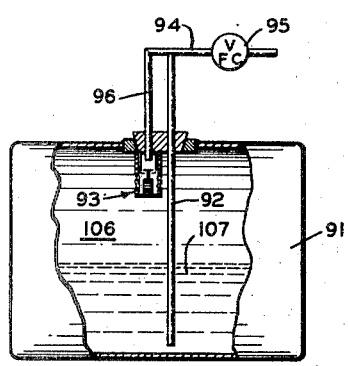
Figure 6:
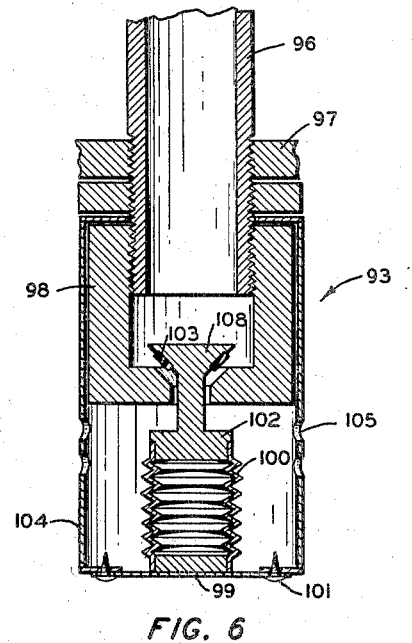
Figure 7:
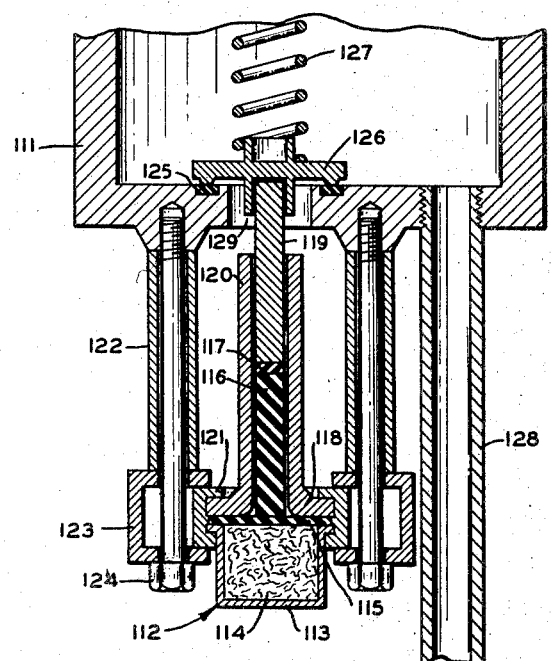
Figure 8:
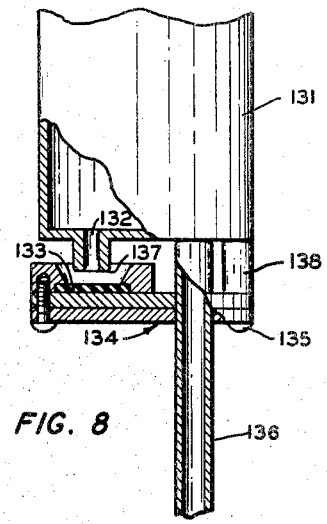
Figure 9:
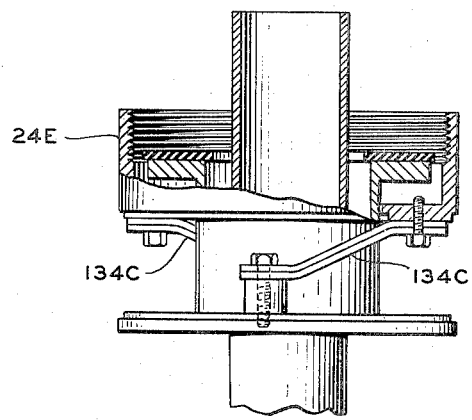
Figure 10:
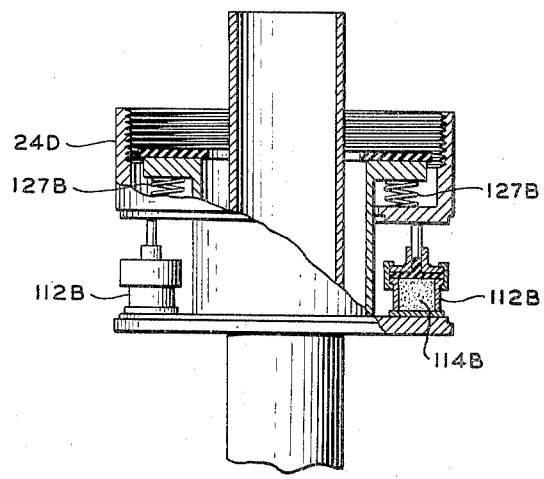

In the drawing, Figure 1 is an elevational view, partly in section, of the apparatus of my invention. Figure 2 is a sectional view of a portion of the apparatus of another embodiment of my invention. Figure 3 is a sectional view of the apparatus of Figure 2 taken under different operating conditions. Figure 4 is a diagrammatic representation of the apparatus of my invention as a portion of a complete internal combustion engine assembly. Figure 5 is an elevational view, partly in section, of another embodiment of my invention. Figure 6 is a sectional elevational view of a portion of the apparatus of Figure 5. Figure 7 is a sectional view of another embodiment of my invention. Figure 8 is an elevational view, partly in section, of still another embodiment. Figure 9 is an elevational view, partly in section, of another valve control apparatus for use with the valve body of Figure 1. Figure 10 is an elevational view, partly in section, of still another embodiment of valve control apparatus for use with the valve body of Figure 1.

In the drawing like reference numerals in the various figures identify corresponding or like parts.

Referring now to the drawing and specifically to Figure 1, this apparatus includes a fuel flow control valve, a starting assembly in conjunction with the temperature operative gas flow control valve of my invention. This apparatus consists of a valve body member 11 which is circular or substantially circular in cross section, a portion of which body member extends inside a liquid propane storage tank 14. This valve body member may be held in its operative position by some threads 12, meshing with threaded collar member 13. This collar member in turn is held rigidly in place in the tank wall by welds 15. Throughout the entire length of this body member 11 is a conduit. This conduit is not of uniform diameter but is of different diameters in different portions of the body member to serve different purposes. In the lower portion of the body member 11 are some vertically disposed ports 16 drilled from the bottom edge of the body. The upper ends of these ports open into a circular space 17 as a manifold. Just above this space 17 is a valve containing space 18 in which a valve 26 is positioned with its valve stem 28 pointing upwardly. A valve seat 29 is provided against which a resilient valve sealing member 45 is held by a valve head 27. This valve assembly is biased against the seat 29 by a compression spring 46. This spring 46 is held in its position by an annular bushing member 49. Into the lower end of this bushing member 49 is inserted tube 47, hereinafter termed a liquid dip-tube. This dip-tube may be held rigidly in its intended position by welding at weld 50, or by threads, as desired. The bushing 49 is held fixed with respect to rotation by a set screw 48. This bushing is threaded into its operative position until the compression spring 46 exhibits a proper compressive force against the valve 26. When this bushing is so adjusted the set screw 48 is then set so that the bushing cannot rotate. The opening within the bushing is identified in Figure 1 by the reference numeral 51. A space above the valve head and surrounding a portion of the valve stem 28 is identified by reference numeral 30. This space is connected with the exterior by a conduit 31, the outer portion of which is threaded for accommodation of a tube 32. Against the upper end of the valve stem 28 is positioned a diaphragm 36. Below this diaphragm is provided a space 57 to accommodate downward movement of the diaphragm. This space 57 is vented by a vent 56 to the atmosphere. Above the diaphragm is positioned an upper housing member 59. In this upper housing member is provided a push plate 37 attached to a stem 40, the upper end of which is threaded into a knob 38. Surrounding this stem 40 is a compression spring 39 for holding the knob 38 in a normally raised position. A guide flange 60 is provided for protection of the spring 39 as well as for guiding the push button 38. An O-ring seal 41 is installed as shown around the stem 40 for sealing the stem against leakage therearound. Another O-ring 58 is provided in a groove in the housing member 11 just above the annular space 30 for prevention of leakage around the valve stem 28.

At the lower portion of this valve assembly is provided a gas flow control valve apparatus which I term a temperature responsive flow control valve. This valve comprises a temperature sensitive bellows 19. A lower plate 20 closes the lower end of the bellows, while an upper plate 24 closes the upper end of the bellows. Bellows 19 may contain the usual thermally expansive fluid common to such thermostatic bellows of the prior art, such as a liquid having a boiling point near the desired operating temperature. Attached to the lower plate 20 is a hollow cylindrical member 21, which extends upward therefrom some distance above the upper plate member 24. To the upper end of this cylinder 21 is provided an annular valve plate member 22. On top of this valve plate member 22 is a resilient sealing member 23. The upper plate member 24 is extended as a threaded bushing member 24a for attaching this bellows assembly to the main body member 11. The inner diameter of the cylinder 21 is such that it is somewhat greater than the outer diameter of the liquid dip-tube 47 so as to provide an annular passageway for flow of gas, which passageway is identified by reference numeral 25.

In the upper portion of this valve assembly, a threaded opening 42 is provided for insertion of a tube 43. This opening 42 is connected to the space above the diaphragm 36 by an opening 42A. Attached to the other end of the tube 43 is one connection of a 3-way solenoid valve assembly 35. This 3-way solenoid valve assembly is illustrated in conjunction with the remainder of the apparatus in Figure 4. This solenoid valve comprises a valve 52 having a tube connection 34 and a valve 53 having a tube connection 54. Reference numeral 44 identifies the solenoid of this valve assembly. Lead wires 55 conduct electricity from a source not shown for operation of the solenoid. From the point of juncture of conduits 32 and 34, a conduit 33 leads to a vaporizer apparatus 66. At this vaporizer 66 a conduit 63 is connected with the conduit 33, the former conduit being connected with a carburetor apparatus 64. The conduit 33 is provided with a constant pressure outlet valve 61. The conduit 63 is also provided with a constant pressure outlet valve 62. Two additional conduits 67 and 68 are provided in conjunction with the vaporizer 66 for inlet and outlet of heating fluid, such as the cooling water of the internal combustion engine. In the apparatus of Figure 4 the liquid propane storage tank is identified by reference numeral 14a, while a vapor-liquid selector assembly of my invention is identified by reference numeral 69.

Figures 2 and 3 illustrate another embodiment of my invention. These figures illustrate the operation of another type of solenoid valve which is the equivalent of the solenoid valve apparatus 35 of Figure 4. In Figure 2 reference numeral 89 identifies an upper valve body member, while reference numeral 72 identifies the main valve body member which is equivalent to the body member 11 of Figure 1. A space 73 is drilled out in the upper body member 89 and a corresponding space 74 is provided in the main body member 72. Within these corresponding spaces are provided a compression spring 76, a valve member 88 having a rigid head 78, and a resilient sealing memer 77 as illustrated. Valve stem 79 extends upward through a small diameter opening above the open space 73 in the body member 89. To the top end of this valve stem member 79 is attached a solenoid 80. Electricity for operating this solenoid is conducted to the solenoid through wires 81 from a source, not shown. Within the valve stem 79 is provided a small conduit 82 as illustrated. A valve seat 87 is provided at the top of the space 73 for contacting the resilient sealing member 77 of the valve 88. An O-ring 83 prevents leakage of material from the space 73 and from a tubular space 86, which tubular space connects with a space above a diaphragm 71. Another O-ring sealing member 75 is provided for sealing the spaces 73 and 74 against leakage between the two body members 72 and 89. A conduit 84 of Figure 2 corresponds to the conduit identified by reference numeral 31 of Figure 1. This conduit 84 conducts propane from the fuel storage tank to a conduit corresponding to conduit 32 of Figure 1. A small conduit 85 is provided in the body member 72 for transmission of propane pressure into the spaces 73 and 74.

Figure 3 illustrates the same embodiment of apparatus as shown in Figure 2, but shows the valve 88 in its seated position against the seat 87. When this valve 88 is seated, it is intended that the conduit 82 in the valve stem 79 provide communication from the conduit 86 to the atmosphere for relief of pressure above the diaphragm 71.

Referring again to Figure 2, when this valve 88 is in its fully opened position as illustrated in this figure, it is intended that the conduit 82 provides communication between the spaces 73 and 74 through conduit 86 to the space above the diaphragm 71.

In Figure 5 is illustrated another embodiment of the thermally responsive valve of my invention. In Figure 5 a propane storage tank is identified by reference numeral 91. Dipping into this tank is a liquid propane dip-tube 92 and a gaseous propane dip-tube 96. The outer ends of these two tubes connect with a conduit 94 which conducts propane fuel to an internal combustion engine apparatus such as that illustrated in Figure 4. This conduit 94 is provided with one or more flow control valves 95. On the end of the gas dip-tube 96 within the tank is provided a thermally operative bellows valve assembly 93. This assembly is illustrated in detail in Figure 6. In Figure 6 is shown the propane gas dip-tube 96, the end of which is threaded. On this threaded end is shown a lock nut 97 and a cap 98. Between this lock nut and cap is a flange of a housing member 104. This housing member 104 is provided with some perforations 105, at points near the end of the tube 96. Attached to the bottom end of the housing member 104 is a plate 99. Bolts or screws 101, as desired, are shown holding plate member 99 to the housing 104. Mounted on the plate 99 is a thermal expansive bellows 100. The top end of this bellows is closed by a plate 102 which also serves as a rigid valve support for a valve 108. Upon this valve head 108 is provided a resilient seal 103 for contacting the valve seat in the cap member 98. The cap 98 on the end of the gas dip-tube 96 is intended to provide a valve seat against which the sealing member 103 is contacted upon contraction of the bellows 100 due to the decrease of temperature within the tank 91 to a certain and predetermined temperature value. Liquid propane within the tank 91 is identified by reference numeral 107 in Figure 5 while the gaseous propane or gas containing space is identified by reference numeral 106.

In the operation of the apparatus of my invention for starting an internal combustion engine, when there is too little propane fuel in the conduit 63 leading to the carburetor it is necessary to push manually the starting knob 38 (Figures 1 and 4). Upon pushing this knob 38 the push plate 37 contacts and pushes downward the diaphragm 36, which in turn opens the valve 26. Upon opening of the valve 26, liquid propane from within the tank rises upward through the liquid dip-tube 47. Some propane passes the valve 26 and flows through the spaces 30 and 31 and is conducted through conduits 32, 33 and 63 to the carburetor. Prior to the pushing of the starting knob 38 the ignition, of course, should be turned on. It is preferred that the solenoid of the solenoid valve assembly 35 be wired with the ignition system so that upon turning on the ignition the circuit to the solenoid of the valve 35 is also closed. When the electrical current flows through wires 55, the solenoid rises to open the valve 52 and to close the valve 53. Upon opening of the valve 52 there is free passage from conduit 34 through valve 52, through conduit 43 and through openings 42 and 42A of Figure 1 to the space on the top side of the diaphragm 36. Accordingly, after the starting knob 38 is pushed downward, and as mentioned before, this pushing operation opens the valve 26, propane flows upward around this valve and out of this valve assembly through the conduit 32. Some propane also passes through conduit 34 and through the solenoid operated valve 52 and through conduit 43 into the space above the diaphragm 36. Thus when propane pressure enters this space above diaphragm 36 the pressure is sufficient to hold this diaphragm in its lowered position to hold open the valve 26. The starting knob 38 may then be released. After propane has passed through conduit 32 in the direction of the solenoid valve apparatus 35 and in the direction of the carburetor 64 the starter may then be operated. Upon starting the engine propane continues to flow from the tank around the valve 26 and out through conduits 32, 33 and 63 for powering the engine. Propane pressure is also maintained through conduit 34, valve 52, conduit 43 and spaces 42 and 42A to the space above the diaphragm 36. Thus, as long as the engine operates with the ignition turned on propane pressure is exerted on the top of the diaphragm 36 to hold open the valve 26. Upon turning off the ignition switch of the engine, current to the solenoid 44 is cut off and valve 52 closes and valve 53 opens. When the valve 53 is opened the propane pressure in the space above the diaphragm 36 bleeds off through opening 42, 42A, conduit 43, valve 53 and the vent line 54. When the pressure above the diaphragm 36 is vented, the compression spring 46 operates to close the valve 26 to prevent leakage of propane fuel. Thus when this valve is closed propane cannot leak from the fuel storage tank.

When the engine is in operation as hereinabove explained, liquid propane is drawn upward through the liquid propane dip-tube 47 around the valve 26. If this automotive equipment is taken out on the road and operated under high temperature conditions the temperature of the propane in this fuel tank may become high. When the temperature of the propane in the vapor space reaches a certain high and predetermined value, the bellows 19 expands and opens the ports 16 to the flow of gaseous propane. The operation of the bellows 19 is such that when the bellows reaches a certain predetermined temperature the bellows expands and the bottom plate 20 moves downward and carries along with it the cylindrical member 21 and the upper plate or valve head 22. When this valve head 22 moves downward the bottom ends of the ports 16 are opened and gaseous propane flows from the vapor space in the fuel tank through the annular space 25 into the ports 16, and thence through the space 17, the space 18 and around the valve 26 and through the several conduits to the carburetor. This bellows 19 is intended to hold the ports 16 open to the flow of vapor as long as the predetermined relatively high temperature is exceeded in the tank. As gaseous propane is removed through these several conduits for operating the engine, pressure of the propane tends to decrease. As the pressure decreases, liquid propane evaporates in an attempt to replace the propane gas withdrawn, with the result that the contents of the tank are cooled by evaporation. When this evaporation and cooling has continued to such an extent that the temperature has decreased to the temperature at which the bellows 19 contracts, the lower ends of the ports 16 are closed by the valve 22 and the sealing member 23. When these ports 16 become closed, liquid propane is then drawn upward through the propane dip-tube 47 and flows out through the conduit 32 toward the carburetor. Liquid propane continues to be withdrawn from the tank until the temperature of the contents within the tank reaches said predetermined relatively high temperature at which the bellows 19 again expands. Thus by selecting the bellows to operate at a given temperature it is possible to control the temperature of the fuel in the propane fuel tank at such a value that excessive pressures do not exist in the fuel tank. It is known that liquid propane possesses a relatively high vapor pressure and when liquid propane in a confined space is exposed to temperatures of 125° to 150° F. pressure may become higher than desired in, for example, automotive equipment. When a truck or bus, for example, is operated on a hot pavement in the heat of full summer, it is possible that the propane fuel tank will reach an undesirably high temperature. Under such conditions, when the vapor-liquid selector valve of my invention is used the contents of the fuel tank will not reach undesirable high temperatures, since the maximum temperature will be determined by the temperature at which the bellows will operate to open for removal of vaporous propane.

The apparatus embodiment of Figures 2 and 3 may be used to replace the solenoid valve assembly 35 of Figure 1. In the assembly illustrated in Figures 2 and 3, it is intended that when the ignition is on and the engine is operating or the starting knob 38 is pushed prior to actual starting, propane pressure will be transmitted from conduit 84 through opening 85 into spaces 74 and 73 and through the small conduit 82 and conduit 86 to the space above the diaphragm 71. Fluid pressure in this space holds the diaphragm down against the valve stem to hold open the valve 26 to the flow of propane fuel. Upon turning off the ignition switch the solenoid 80 becomes deenergized and allows the compression spring 76 to close the valve 88 (Figure 3). The valve 88 is closed against its seat 87 and fluid pressure cannot be transmitted from its source to the space above the diaphragm. Fluid pressure already in the space above the diaphragm is permitted to vent through conduit 86 and conduit 82 in the valve stem to the atmosphere. When this venting is complete the compression spring 46 operates to close the valve 26 against all flow of propane.

The embodiment illustrated in Figures 5 and 6 operates in a manner similar to the apparatus of Figure 1. The thermally responsive bellows assembly 93 is intended to operate and to close off the flow of propane gas from the vapor space 106 into the propane gas dip-tube 96. This bellows (100 of Figure 6) is so selected that it will operate to extend itself when it is exposed to a predetermined temperature above which it is desired that the propane contents of the tank 91 should not be heated. When the bellows 100 becomes extended the resilient sealing member 103 is lifted from its seated position and opens tube 96 to the flow of vaporous propane. The bellows closes this valve at all times when the temperatures are below the temperatures at which the bellows is designed to close. When this bellows holds the valve closed liquid propane is then drawn from the bottom of the tank through the propane dip-tube 92 into conduit 94 and through the flow control valve 95 to the carburetion system. The removal of liquid propane from the tank causes no cooling of the remaining propane and when operating under high temperature conditions the contents remaining in the tank will be gradually heated. Thus when the contents reaches the temperature at which the bellows operates the bellows will again open to permit withdrawal of vaporous propane.

Figure 7 is illustrative of another type of thermally responsive element which is adapted to open and to close a valve in accordance with the principles of my invention. This valve assembly contains a body member 111 more or less similar to the body 11 of Figure 1. This body member 111 is intended to be disposed partly in a fuel tank and partly outside. In the base of the body 111 is an opening 129 through which a plunger 119 extends. Around the opening 129 and within the body 111 is a resilient member 125 which serves as a valve seat. Resting on the upper end of the plunger 119 is a valve head 126 biased into a normally closed position by a compression spring 127. Disposed below and attached to the underside of the bottom of the body member is the valve operating mechanism 112. This mechanism is composed of some thermally expansive material 114 disposed within a case 113. Directly above this expansive material 114 is a disc 115 of resilient material. Immediately above the center of this disc is a plunger of resilient material 116. Between the upper end of this resilient plunger 116 and the lower end of the metal plunger 119 is a slug of resilient material which serves to separate the end of the resilient plunger 116 from the end of the metal plunger 119. Surrounding a portion of the plunger 119, the slug 117 and the resilient plunger is a sleeve 120 which serves to guide movement of its contents. The bottom end of the sleeve 120 is flanged at 118. The upper rim of the case 113 is also flanged outward. This rim of the case, the edge of the resilient member 115 and the flange of the sleeve 120 are bound tightly together with a double flanged clamp member 121, as shown. This clamp is held as shown by some U-shaped clamps 123 which in turn are attached to the body member 111 by some bolts 124. This thermal responsive assembly 112 is held at a fixed distance from the body member by spacer tubes 122 surrounding the bolts 124.

The annular space 129 surrounding the metal plunger 119 serves as the opening through which gaseous propane may pass when the valve 126 is open.

When the temperature within the vapor space of a liquid propane containing fuel tank increases, the thermally expansive material 114 expands with the result that the center of the resilient member or diaphragm 115 moves in an upward direction to force plungers 116 and 119 upward to open the valve 126. Conversely when the temperature drops, the material 114 contracts with the result that members 116 and 119 move downward to close valve 126. When the valve 126 is closed liquid propane is drawn through the propane dip-tube 128 for passage to the carburetor.

Figure 8 illustrates the use of a bimetallic thermally responsive element 134 for closing and opening a fuel valve. In this embodiment a bimetallic element 134 is provided at one end with a resilient sealing member 133 and at the other end it is attached to a body member 131 by a bolt 135 at a spaced distance by a spacer 138. A gas flow dip-tube 137 extends into the gas space of a fuel tank and the lower end 137 serves as a valve seat as shown. When the tank temperature decreases the sealing member 133 rises to contact the valve seat 137 and to close off the flow of vapors. At this time liquid propane is then drawn through a liquid dip-tube 136. Conversely when the tank and its contents warm sufficiently the bimetallic element contracts and moves resilient member 133 away from seat 137 to open the apparatus to the flow of vaporous fuel.

Such an element as the thermally responsive element 112 of Figure 7 contains a solid or semi-solid thermally expansive material.

Figure 9 illustrates a valve opening and closing mechanism employing thermally expansive bimetallic elements 134C for opening and closing ports 16 of the lower end of the main body member 11 of Figure 1. The threaded collar element 24E merely replaces the threaded collar element 24A of Figure 1 when it is desired to employ the thermally expansive bimetallic port opening and closing apparatus of Figure 9 in place of the bellows operated element.

Figure 10 illustrates a valve opening and closing mechanism involving use of thermally sensitive elements 112B similar to element 112 of Figure 7. These elements 112B contain thermally expansive solid material 114B like the material of 114 of Figure 7. The threaded collar element 24D merely replaces the threaded collar element 24A of Figure 1 when it is desired to employ the thermally expansive solid material containing element of Figure 10 as the port opening and closing apparatus in place of the bellows. In Figure 10 compression springs 127B correspond to the compression spring 127 of Figure 7. These springs are necessary for closing the valves upon contraction of the thermally expansive solid material 114 and 114B. The remainder of the apparatus parts of Figures 9 and 10 are like or substantially like the corresponding parts of Figure 1.

Obviously any of the thermally responsive valves of any one of the Figures 7 to 10 can be substituted for the thermally responsive valve 23 of Figure 1 without invention. The replacement of Figures 9 and 10 is by merely unscrewing 24A and connected parts of Figure 1 and screwing on 24E of Figure 9, or 24D of Figure 10, and connected parts. In substituting the valves of Figures 7 and 8, it will be noted that at the top of part 49 of Figure 1 the structure is the same as at the bottom of part 111 of Figure 7 and part 131 of Figure 8, it being obvious to change holes 16 to a single hole 129 of Figure 7 or 132 of Figure 8.

While the valves described hereinbefore have been of the top tank outlet type, it is within the scope of my invention to adapt the herein disclosed selector valve to bottom outlet type fuel tanks. In this case, the fuel outlet enters the bottom of the tank and extends upward into space normally occupied by vapor and near the top. A tube of larger diameter surrounds the fuel tube to provide an annular passageway for removal of liquid from the bottom of the tank. The top end of this tube terminates as a valve seat. A valve head, moved by a thermally responsive bellows, opens or closes the valve. When open, gaseous or vaporous fuel flows and when closed, only liquid fuel flows through the fuel line.

Materials of construction may be selected from among those commercially available and adapted for use in such applications. It is preferable to use materials not easily corroded by oxygen and/or moisture.

While certain embodiments of the invention have been described for illustrative purposes, the invention obviously is not limited thereto.

I claim:

1. A liquid-vapor selector and shut-off valve assembly for use in liquefied petroleum gas fuel systems comprising, in combination, an elongated body member, a conduit in said body member, a valve in said conduit for opening and closing said conduit to the flow of fluid, said valve having a stem, a compression spring biasing said valve in a normally closed position, a pressure operative diaphragm in operative contact with the stem of said valve, a manually operable push means at the valve stem end of said body member to move said diaphragm to open said valve against the bias of said spring, a first opening in said valve body between said diaphragm and said manually operable push means for admission and exhausting of pressure fluid, a second opening through the wall of said body member on the valve stem side of said valve for outlet of fuel passing said valve, a dip conduit attached to the other end of said body member for admission of liquid fuel to said valve, a port in said body member leading from said other end thereof to a point in said first mentioned conduit on the compression spring side of said valve, a thermally operable valve for closing and opening said port, and a sealing means surrounding said valve stem in the first mentioned conduit to prevent leakage of fuel to the adjacent side of said diaphragm.

2. The liquid-vapor selector valve of claim 1 wherein said thermally operable valve for closing and opening said port is a bellows operable valve.

3. In the liquid-vapor selector valve of claim 1 wherein the thermally operable valve is a bimetallic thermostatic valve.

4. In the liquid-vapor selector valve of claim 1 wherein the thermally expansive material of the thermally operable valve is a thermally expansible solid material.

5. In the liquid-vapor selector valve of claim 2 wherein said bellows operable valve comprises, in combination, an annular ring surrounding said dip conduit at said other end of said body member, a resilient sealing member between said annular ring and said other end of said body member containing said ports, a hollow cylindrical member surrounding said dip conduit, one end of said hollow cylindrical member being rigidly attached to said annular ring, said hollow cylindrical member being of sufficiently large diameter as to provide an annular space between itself and said dip conduit, a second annular ring surrounding said dip conduit and being rigidly attached to the other end of said hollow cylindrical member, a thermally expansible bellows of annular cross section surrounding said hollow cylindrical member, one end of said bellows being attached in a fluid tight manner to said second annular ring, the other end of said bellows being attached to said other end of said elongated body member of generally circular cross section, and said thermally expansible bellows being adapted to bias said resilient sealing member against said port upon decrease of temperature of said bellows.

6. A liquid-vapor selector valve for use in liquefied petroleum gas fuel systems comprising in combination, an elongated body member, a conduit throughout the length of said body member, the axis of said conduit coinciding with the axis of said body member, a valve in said conduit for opening and closing said conduit to the flow of fluid, the axis of said valve coinciding with the axis of said body member; a compression spring biasing said valve in a normally closed position, a pressure operative diaphragm in operative contact with the stem of said valve, a manually operable push means at the valve stem end of said body member to move said diaphragm to open said valve against the bias of said spring, a first opening in said valve body between said diaphragm and said manually operable push means for admission and exhausting of pressure fluid, a second opening through the wall of said body member on the valve stem side of said valve for outlet of fuel passing said valve, a dip conduit attached to the other end of said body member for admission of liquid fuel to said valve, a port in said body member leading from said other end thereof to a point in said first mentioned conduit on the compression spring side of said valve, a thermally operable valve for closing and opening said port, a sealing means surrounding said valve stem in the first mentioned conduit to prevent leakage of fuel to the adjacent side of said diaphragm and a further conduit being in communication with said second opening, said further conduit also being in communication with a solenoid operated valve and in further communication through said valve with said first opening for admission to and exhausting pressure fluid from said first opening.

7. In the liquid-vapor selector valve of claim 3 wherein said bimetallic thermostatic valve comprises, in combination, an annular ring surrounding said dip conduit at said other end of said body member, a resilient sealing member between said annular ring and said other end of said body member containing said port, a hollow cylindrical member surrounding said conduit, one end of said hollow cylindrical member being rigidly attached to said annular ring, said hollow cylindrical member being of sufficiently large diameter as to provide an annular space between itself and said dip conduit, a second annular ring surrounding said dip conduit and being rigidly attached to the other end of said hollow cylindrical member, a thermally expansible bimetallic member attached at one end to said second annular ring and at the other end to said other end of said elongated body member in such a manner that upon increase in temperature of said bimetallic member said resilient sealing member moves away from said port to open same to gas flow and upon a decrease in temperature of said bimetallic member said resilient sealing member moves toward said ports to close same against vapor flow therethrough.

8. In the liquid-vapor selector valve of claim 4 wherein the thermally expansible solid material actuated valve comprises, in combination, an annular ring surrounding said dip conduit at said other end of said body member, a resilient sealing member between said annular ring and said other end of said body member containing said port, a hollow cylindrical member surrounding said dip conduit, one end of said hollow cylindrical member being rigidly attached to said annular ring, said hollow cylindrical member being of sufficiently large diameter as to provide an annular space between itself and said dip conduit, a second annular ring surrounding said dip conduit and being rigidly attached to the other end of said hollow cylindrical member, a thermally expansible solid material element attached at one end to said second annular ring and at the other end to said other end of said body member in such a manner that upon increase in temperature of said thermally expansible solid material element said resilient sealing member moves away from said port to open same as the flow of gas, a spring element connecting said first mentioned annular ring and said other end of said body member biasing said resilient sealing member in closed relation with respect to said port upon decrease of temperature of said thermally expansible solid material element.

References Cited in the file of this patent

UNITED STATES PATENTS

| | | |
|---|---|---|
| 1,015,596 | Stickle | Jan. 23, 1912 |
| 1,219,516 | Whittelsey | Mar. 20, 1917 |
| 1,312,644 | Raab | Aug. 12, 1919 |
| 1,688,092 | Smith | Oct. 16, 1928 |
| 1,714,758 | Bloch | May 28, 1929 |
| 1,867,849 | Kuenhold | July 19, 1932 |
| 2,073,276 | Ensign | Mar. 9, 1937 |
| 2,158,458 | Mathis | May 16, 1939 |
| 2,226,810 | Ensign | Dec. 31, 1940 |
| 2,261,080 | Stellhorn | Oct. 28, 1941 |
| 2,285,905 | Cunningham | June 9, 1942 |
| 2,401,651 | Mathis | June 4, 1946 |
| 2,402,355 | Whaley | June 18, 1946 |
| 2,406,540 | Harrington | Aug. 27, 1946 |
| 2,409,611 | Bodine | Oct. 22, 1946 |
| 2,456,890 | St. Clair | Dec. 21, 1948 |
| 2,532,710 | Goddard | Dec. 5, 1950 |
| 2,536,322 | Smith | Jan. 2, 1951 |
| 2,598,351 | Carter | May 27, 1952 |
| 2,632,430 | MacSporran | Mar. 24, 1953 |
| 2,645,906 | Ryan | July 21, 1953 |
| 2,677,937 | Jones | May 11, 1954 |